(12) United States Patent
Ito et al.

(10) Patent No.: US 6,706,183 B2
(45) Date of Patent: Mar. 16, 2004

(54) FILTER

(75) Inventors: Kouichi Ito, Sashima-gun (JP); Takashi Arai, Sashima-gun (JP); Yoshiichi Koguchi, Sashima-gun (JP)

(73) Assignee: Kyosan Denki Co., Ltd., Sashima-gun (JP)

( * ) Notice: Subject to any disclaimer, the term of this patent is extended or adjusted under 35 U.S.C. 154(b) by 0 days.

(21) Appl. No.: 10/020,994

(22) Filed: Dec. 19, 2001

(65) Prior Publication Data

US 2002/0079265 A1 Jun. 27, 2002

(30) Foreign Application Priority Data

Dec. 25, 2000 (JP) .......................................... 2000-392310

(51) Int. Cl.[7] .......................... B01D 25/00; B01D 27/14; B01D 29/56
(52) U.S. Cl. .................... 210/416.1; 210/460; 210/484; 210/489
(58) Field of Search .............................. 210/416.1, 416.4, 210/483, 484, 485, 488, 489, 490, 459–463

(56) References Cited

U.S. PATENT DOCUMENTS

| 2,100,951 | A | * | 11/1937 | Glass et al. ................. 210/461 |
| 2,569,243 | A | * | 9/1951 | Kovacs ........................ 210/460 |
| 2,676,921 | A | * | 4/1954 | Vansteenkiste .............. 210/169 |
| 3,441,140 | A | * | 4/1969 | Thruber ....................... 210/170 |
| 3,722,686 | A | * | 3/1973 | Arnett et al. ................ 210/170 |
| 5,055,187 | A |   | 10/1991 | Ito et al. |

OTHER PUBLICATIONS

U.S. patent application Ser. No. 09/906,687, Ito et al., filed Jul. 18, 2001.

* cited by examiner

Primary Examiner—Fred G. Prince
(74) Attorney, Agent, or Firm—Oliff & Berridge, PLC

(57) ABSTRACT

A filter includes upper and lower filter members that form at least two opposed surfaces that face each other, a porous member contained in the filter member, and a coupling member having an opening that is open to the porous member so that the porous member communicates with the coupling member. In the filter, the filter member removes foreign matters contained in liquid, and the liquid from which the foreign matters are removed is discharged through the porous member and the coupling member.

11 Claims, 4 Drawing Sheets ical resin
and has a multiplicity of apertures formed therein. The
FILTER

INCORPORATION BY REFERENCE

BACKGROUND OF THE INVENTION

1. Field of the Invention

The invention generally relates to the structure of a filter, and more particularly to the structure of an in-tank type fuel filter installed in a fuel tank of a motor vehicle, such as an automobile.

2. Description of Related Art

A known example of an in-tank type fuel filter installed in a fuel tank of a motor vehicle will be hereinafter described with reference to FIG. 7 and FIG. 8.

FIG. 7 shows a fuel tank 1 installed in a motor vehicle, such as an automobile. A fuel pump 3 for delivering fuel to a fuel injection system 4 is disposed in the fuel tank 1. A fuel filter 2 is attached to a coupling member 7, which in turn is attached to the fuel inlet side or upstream side of the fuel pump 3.

The fuel filter 2 is illustrated in detail in FIG. 8. One of the opposite ends of the fuel filter 2 is coupled to the fuel pump 3 via the coupling member 7, while the other end of the fuel filter 2 abuts on a bottom wall 9 of the fuel tank 1. With this arrangement, the fuel pump 3 is able to pump up a sufficient amount of fuel even when the level of the fuel in the fuel tank 1 is lowered.

The fuel filter 2 includes a filter member 5 and a protector 6 disposed inside the filter member 5. The filter member 5 consists of a mesh screen that is formed of a synthetic resin and has a multiplicity of apertures formed therein. The protector 6, which is formed of a synthetic resin, functions to prevent adhesion of two or more sheets of the filter member 5, and ensure a sufficiently large volume of inner space 8 so that a fuel passage can be surely formed in the fuel filter 2.

The known fuel filter 2 as described above is advantageous in that the protector 6 can prevent adhesion of two or more sheets of the filter member 5 to thereby ensure a sufficient volume of inner space 8. In addition, the protector 6 serves to press the filter member 5 of the fuel filter 2 against the bottom wall 9 of the fuel tank 1.

The known fuel filter 2, however, has the following problems. First of all, the provision of the protector 6 results in increases in the overall weight and cost of the fuel filter 2. Secondly, the rigidity of the protector 6 is utilized to press the fuel filter 2 (more specifically, the filter member 5) against the bottom wall 9 of the fuel tank 1, and therefore the filter member 5 is likely to wear, and suffers from a reduced durability. In addition, vibrations of the fuel pump 3 are transmitted to the fuel tank 1 via the protector 6, causing abnormal or unusual noise and making a passenger of the vehicle feel uncomfortable.

Furthermore, the protector 6, which is molded out of a synthetic resin, undergoes deformation (e.g., warpage) when it is immersed in the fuel, and the filter member 5 also deforms along with the protector 6. As a result, the durability of the filter member 5 may deteriorate.

In addition, a corner portion of the protector 6 abrades a portion of the filter member 5 that is in contact with the bottom wall 9 of the fuel tank 1, possibly causing early wear and damage of the filter member 5.

SUMMARY OF THE INVENTION

It is therefore an object of the invention to provide a filter that is available at a reduced cost, compact in size, and has an improved durability.

To accomplish the above and/or other objects, there is provided according to one aspect of the invention, which provides a filter that includes (a) at (b) at least one porous member contained in the at least one filter member, and (c) a coupling member having an opening that is open to the at least one porous member so that the porous member communicates with the coupling member. In the filter, the filter member removes foreign matters contained in a liquid, and the liquid from which the foreign matters are removed is discharged through the porous member and the coupling member. With this arrangement, the filter is sure to be provided with sufficiently large inner space and fuel passage (s), without requiring the protector as used in the known filter. Thus, the filter does not suffer from wear that would be otherwise caused by the protector, and therefore the service life of the filter is increased or extended.

In one embodiment of the invention, the filter has a three-layer structure having first and second filter members, and a porous member, which structure is constructed such that the first and second filter members cover upper and lower surfaces of the porous member, respectively. In another embodiment of the invention, the filter has a four-layer structure having first and second filter members and first and second porous members, in which one surface of the first porous member that is not covered by the first filter member is superposed on one surface of the second porous member that is not covered by the second filter member. In a further embodiment of the invention, the filter has a four-layer structure that is formed by bending a two-layer structure comprising one porous member and one filter member covering one surface of the porous member, at a substantially middle portion of the two-layer structure. In any of these embodiments, the filter is surely provided with sufficiently large inner space and fuel passage(s), without requiring the protector as used in the known filter. Thus, the filter does not suffer from wear that would be otherwise caused by the protector, and therefore the service life of the filter is prolonged or extended. Furthermore, the filter can be manufactured in a simplified manner at a reduced cost.

The filter member as indicated above may be formed of filter paper or a non-woven fabric. In this case, the weight of the filter as a whole can be reduced, and the filter can be manufactured in a simplified manner at a reduced cost.

The filter member as indicated above may also be formed from a non-woven fabric and a mesh screen. With the filter member thus formed, the durability of the filter is enhanced, and wear of the filter member, especially when pressed against the bottom wall of the fuel tank, can be advantageously reduced or mitigated. Consequently, the service life of the filter can be prolonged.

In another embodiment of the invention, the coupling member is provided on the upper one of the filter members. With this arrangement, the entire area of the lower filter member is able to abut on the bottom wall of the fuel tank, so that the filter can pump up fuel without fail even if the fuel level in the tank is lowered.

In a still another embodiment of the invention, the coupling member extends from the upper filter member to the lower filter member. In this case, the coupling member can surely hold the filter, while preventing deformation thereof.

In a yet another embodiment of the invention, the coupling member is provided on a side face of the filter member. With this arrangement, a fuel pump disposed within the fuel tank can be located in the vicinity of the inner wall of the fuel tank. Thus, the mounting position of the fuel pump can be determined with increased flexibility.

BRIEF DESCRIPTION OF THE DRAWINGS

The foregoing and/or further objects, features and advantages of the invention will become more apparent from the following description of preferred embodiments with reference to the accompanying drawings, in which like numerals are used to represent like elements and wherein.

DETAILED DESCRIPTION OF PREFERRED EMBODIMENTS

First Embodiment

Figure 1:
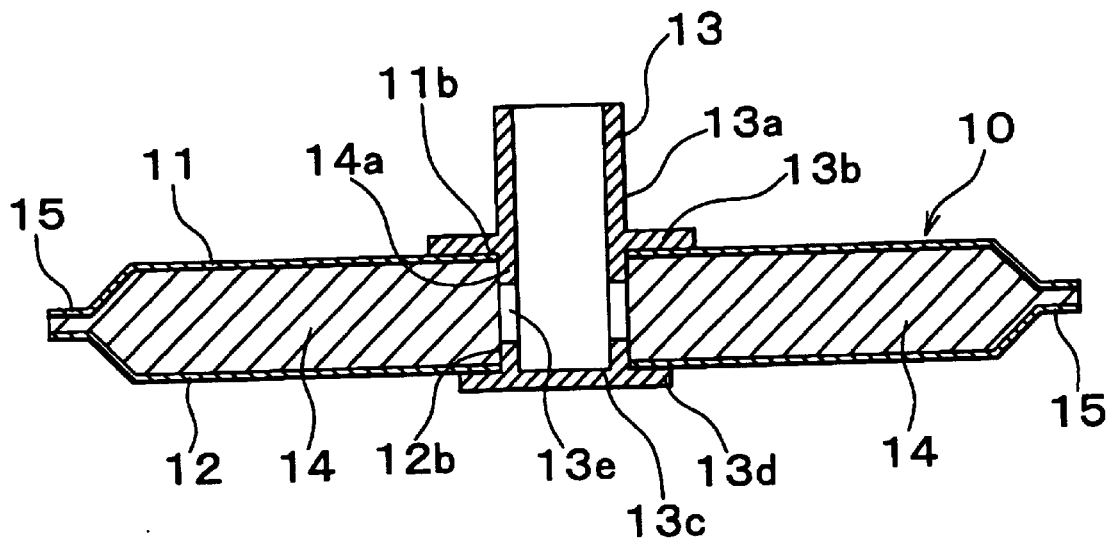
FIG. 1 is a cross-sectional view showing a fuel filter according to a first embodiment of the invention.

FIG. 1 illustrates an in-tank type fuel filter 10 according to a first embodiment of the invention. The fuel filter 10 has a generally rectangular shape as viewed in a plane perpendicular to the sheet of FIG. 1. The fuel filter 10 is coupled, via a coupling member 13, to the upstream side of a fuel pump installed in a fuel tank of a motor vehicle.

The fuel filter 10 includes an upper filter member 11, a lower filter member 12, a porous member 14 disposed between the filter members 11, 12, and the coupling member 13. The upper and lower filter members 11, 12 are formed by cutting filter paper or a non-woven fabric into a predetermined shape so that these filter members 11, 12 have substantially the same shape. A peripheral portion 15 is formed at a periphery of each of the filter members 11, 12, and openings 11b, 12b for receiving an end portion of the coupling member 13 are formed through central portions of the filter members 11, 12, respectively. The non-woven fabric is preferably formed by mixing raw fibers with adhesive fibers. The raw fibers may be selected from polyester, polypropylene, rayon, glass, acetate and others. The adhesive fibers may be formed by coating fibers of polyester, polypropylene, rayon, glass, acetate, or the like, with a low-melting-point resin, such as modified polyester, modified polyethylene, modified polypropylene, or the like.

The porous member 14 may be a foamed member, a sponge-like member, or the like, which is made of a material, such as polyester, nylon, or polypropylene, as widely known in the art. Namely, the porous member 14 may be formed from any type of member provided that it forms oil paths through which the fuel is allowed to flow without any difficulty, and that it is able to retain its original shape. In fabricating the fuel filter 10, the porous member 14 is first formed in the shape of a flat plate whose thickness is substantially equal to that of the filter 10, and is then cut into a suitable shape in accordance with the shape of the upper and lower filter members 11, 12. Then, a bore 14a is formed through a central portion of the porous member 14, so that the coupling member 13 can be fitted in the bore 14a as described later.

Subsequently, the porous member 14 is interposed between the upper filter member 11 and the lower filter member 12. The peripheral portions 15 of the upper filter member 11 and the lower filter member 12 are welded onto a peripheral portion of the porous member 14 by a thermal welding means, such as ultrasonic welding or electrodeposition, while force is being applied from the upper and lower sides of the filter members 11, 12. In this manner, the porous member 14 fills the inner space between the filter members 11, 12, to thus form fuel paths in the filter 10.

In the first embodiment as described above, the peripheral portion of the porous member 14 is formed simultaneously with the peripheral portions of the upper filter member 11 and the lower filter member 12 through the thermal welding means. However, the upper and lower filter members 11, 12 and the porous member 14 may be initially formed into a three-layer integral sheet, which is then cut into a suitable shape, with its periphery welded by a thermal welding means, such as ultrasonic welding or electrodeposition.

The coupling member 13 consists of an upper member 13a having a flange 13b, and a lower member 13c having a flange 13d. The upper and lower members 13a, 13c are inserted from the upper side and the lower side of the filter 10 into the bore 14a of the porous member 14, through the openings 11b, 12b of the upper filer member 11 and the lower filter member 12, respectively. Then, the upper and lower members 13a, 13c are integrated together with their end faces secured to each other with an adhesive, or the like. A plurality of semicircular openings that provide fuel passages are formed in portions of the upper member 13a and the lower member 13c adjacent to their end faces, so that a plurality of fuel inlets 13e are formed when the end faces of the upper and lower members 13a, 13b abut on each other.

The flanges 13b, 13d are fixed or secured at their corresponding faces to the upper filter member 11 and the lower filter member 12, respectively, by an adhesive or any other bonding means, so that deformation of the filter 10 can be prevented or suppressed. While the filter 10 has a generally rectangular shape in the first embodiment, the filter may have a circular shape, or any other shape.

Second Embodiment

Figure 2:
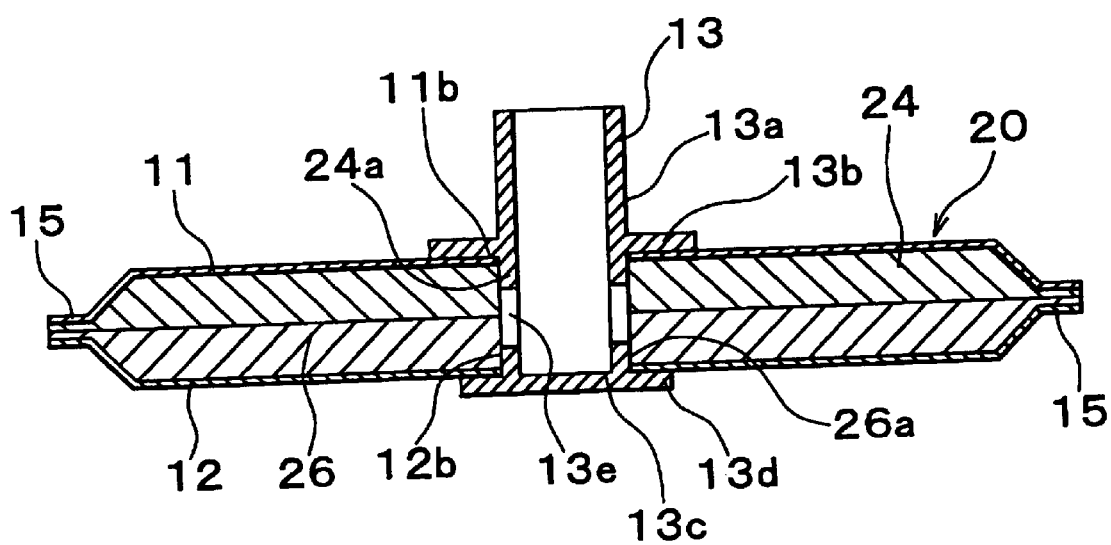
FIG. 2 is a cross-sectional view showing a fuel filter according to a second embodiment of the invention.

FIG. 2 illustrates an in-tank type fuel filter 20 according to a second embodiment of the invention. The fuel filter 20 has a generally rectangular shape as viewed in a plane perpendicular to the sheet of FIG. 2. The fuel filter 20 is coupled, via a coupling member 13, to the upstream side of a fuel pump installed in a fuel tank of a motor vehicle.

The fuel filter 20 includes an upper filter member 11, a lower filter member 12, two-layer porous members 24, 26 disposed between the filter members 11, 12, and the coupling member 13. The upper and lower filter members 11, 12 are formed by cutting filter paper or a non-woven fabric into a predetermined shape so that these filter members 11, 12 have the same shape. A peripheral portion 15 is formed at a periphery of each of the filter members 11, 12, and openings 11b, 12b for receiving an end portion of the coupling member 13 are formed through central portions of the filter members 11, 12, respectively.

Each of the porous members 24, 26 may be a foamed member, a sponge-like member, or the like, which is made of a material, such as polyester, nylon, or polypropylene, as widely known in the art. Namely, the porous member 24, 26 may be formed from any type of member provided that it forms oil paths through which the fuel is allowed to flow without any difficulty, and that it is able to retain its original shape. In fabricating the fuel filter 20, each of the porous members 24, 26 is first formed in the shape of a flat plate whose thickness is substantially a half of the thickness of the filter 20. One surface of the porous member 24 is bonded to the upper filter member 11 with an adhesive, or the like, and one surface of the porous member 26 is bonded to the lower filter member 12 with an adhesive, or the like. Thus, a pair of two-layer assemblies, i.e., an assembly of the porous member 24 and the upper filter member 11 and an assembly of the porous member 26 and the lower filter member 12, are prepared. Then, bores 24a, 26a for receiving the coupling member 13 are formed through central portions of the porous members 24, 26.

Subsequently, the porous members 24, 26 are superposed on each other so as to form a four-layer structure. Then, the peripheral portions 15 of the upper filter member 11 and the lower filter member 12 are welded onto peripheral portions of the porous members 24, 26 by thermal welding means, such as ultrasonic welding or electrodeposition, while force is being applied from the upper and lower sides of the filter members 11, 12. In this manner, the porous members 24, 26 fill the inner space between the filter members 11, 12, to thus form fuel paths in the filter 20.

In the second embodiment as described above, the peripheral portions of the porous members 24, 26 are formed simultaneously with the peripheral portions of the upper filter member 11 and the lower filter member 12 through the thermal welding means. However, two-layer integral sheets each consisting of a filter member and a porous member may be initially prepared, and cut into a suitable shape. Then, the porous members of the resulting cut sheets are superposed on each other, with the peripheries of the cut sheets welded together by thermal welding means, such as ultrasonic welding or electrodeposition.

The coupling member 13 consists of an upper member 13a having a flange 13b, and a lower member 13c having a flange 13d. The upper and lower members 13a, 13c are inserted from the upper side and the lower side of the filter 20 into the bores 24a, 26a of the porous members 24, 26, through the openings 11b, 12b of the upper filer member 11 and the lower filter member 12, respectively. Then, the upper and lower members 13a, 13c are integrated together with their end faces secured to each other by an adhesive, or the like. A plurality of semicircular openings that provide fuel passages are formed in portions of the upper member 13a and the lower member 13c adjacent to their end faces, so that a plurality of fuel inlets 13e are formed when the end faces of the upper and lower members 13a, 13b abut on each other.

The flanges 13b, 13d are fixed at their corresponding faces to the upper filter member 11 and the lower filter member 12, respectively, by an adhesive or any other bonding means, so that deformation of the filter 20 can be prevented or suppressed. While the filter 10 has a generally rectangular shape in the second embodiment, the filter may have a circular shape, or any other shape.

Third Embodiment

Figure 3:
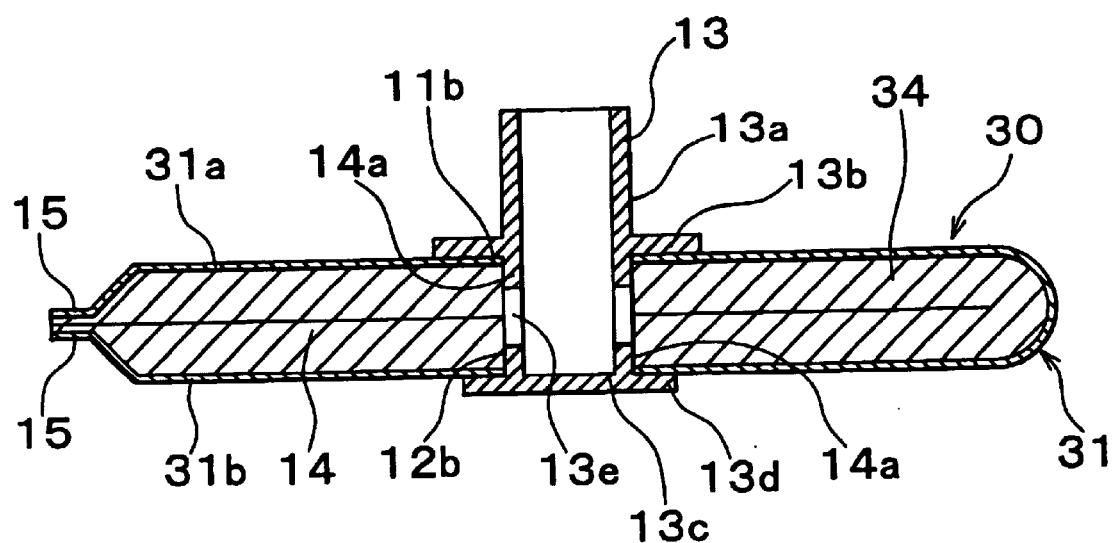
FIG. 3 is a cross-sectional view showing a fuel filter according to a third embodiment of the invention.

FIG. 3 illustrates an in-tank type fuel filter 30 according to a third embodiment of the invention. The fuel filter 30 has a four-layer structure formed by folding a two-layer integral sheet consisting of a filter member and a porous member.

The in-tank type fuel filter 30 has a generally rectangular shape as viewed in a plane perpendicular to the sheet of FIG. 3. The fuel filter 30 is coupled, via a coupling member 13, to the upstream side of a fuel pump installed in a fuel tank of a motor vehicle.

The fuel filter 30 includes a filter member 31, two-layer porous member 34 disposed between the upper half 31a and the lower half 31b of the filter member 31, and the coupling member 13. The filter member 31 is formed by cutting filter paper or a non-woven fabric into a predetermined shape having a length that is twice as large as the length of the filter 30. A peripheral portion 15 is formed at a periphery of the filter member 31, and openings 11b, 12b for receiving an end portion of the coupling member 13 are formed through portions of the filter member 31 that are spaced apart from the longitudinally opposite end faces thereof by a distance equal to one-fourth of the length of the filter 30.

The two-layer porous member 34 may be a foamed member, a sponge-like member, or the like, which is made of a material, such as polyester, nylon, or polypropylene, as widely known in the art. Namely, the porous member 34 may be formed from any type of member provided that it forms oil paths through which the fuel is allowed to flow without any difficulty, and that it is able to retain its original shape. In fabricating the fuel filter 30, the porous member 34 is first formed in the shape of a flat plate whose thickness is a half of the thickness of the filter 30, and whose length is twice the length of the filter 30. Then, bores 34a for receiving the coupling member 13 are formed through portions of the porous member 34 that are spaced apart from the longitudinally opposite end faces thereof by a distance equal to one-fourth of the length of the filter 30.

Subsequently, one surface of the porous member 34 is bonded to one surface of the filter member 31 by an adhesive, or the like, to form a two-layer structure, which is then folded at a longitudinally middle portion thereof with one half of the porous member 34 facing the other half, thereby to provide a four-layer structure. Thus, the upper half 31a and the lower half 31b of the filter member 31 are formed. Then, the peripheral portions 15 of the upper half 31a and lower half 31b of the filter member 31 except its folded portion are welded onto a peripheral portion of the porous member 34 by thermal welding means, such as ultrasonic welding or electrodeposition, while force is being applied from the upper and lower sides of the filter member 31. In this manner, the porous member 34 fills the inner space between the upper half 31a and lower half 31b of the filter member 31, to thus form fuel paths in the filter 30.

In the third embodiment as described above, the peripheral portion of the porous member 34 except its folded portion is formed simultaneously with the peripheral portions of the upper half 31a and the lower half 31b of the filter member 31 through the thermal welding means. However, a two-layer integral sheet consisting of a filter member and a porous member and having a length that is about twice the length of the filter 30 may be initially prepared, and then cut into a suitable shape after being folded once. Then, the periphery of the two-layer sheet is welded by thermal welding means, such as ultrasonic welding or electrodeposition.

The coupling member 13 consists of an upper member 13a having a flange 13b, and a lower member 13c having a flange 13d. The upper and lower members 13a, 13c are inserted from the upper side and the lower side of the filter 30 into the bores 34a of the porous member 34, through the openings 11b, 12b of the filter member 31, respectively. Then, the upper and lower members 13a, 13c are integrated together with their end faces secured to each other with an adhesive, or the like. A plurality of semicircular openings that provide fuel passages are formed in portions of the upper member 13a and the lower member 13c adjacent to their end faces, so that a plurality of fuel inlets 13e are formed when the end faces of the upper and lower members 13a, 13b abut on each other.

The flanges 13b, 13d are fixed at their corresponding faces to the upper half 31a and the lower half 31b of the filter member 31, respectively, by an adhesive or any other bonding means, so that deformation of the filter 30 can be prevented or suppressed. While the filter 10 has a generally rectangular shape in the second embodiment, the filter may have any other shape provided that the folded portion is formed straight.

Fourth Embodiment

Figure 4:
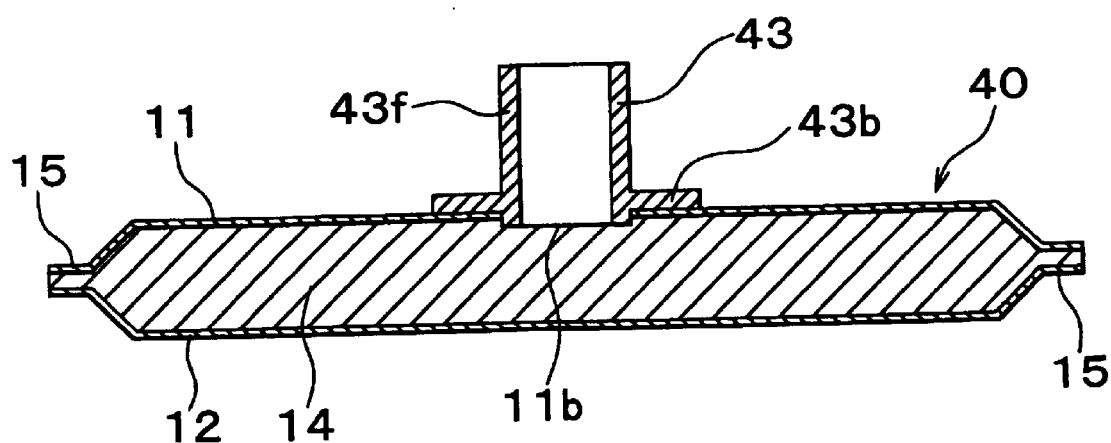
FIG. 4 is a cross-sectional view showing a fuel filter according to a fourth embodiment of the invention.

FIG. 4 illustrates an in-tank type fuel filter 40 according to a fourth embodiment of the invention. The fuel filter 40 has a generally rectangular shape as viewed in a plane perpendicular to the sheet of FIG. 4. The fuel filter 40 is coupled, via a coupling member 43, to the upstream side of a fuel pump installed in a fuel tank of a motor vehicle.

The fuel filter 40 includes an upper filter member 11, a lower filter member 12, a porous member 14 disposed between the filter members 11, 12 and the coupling member 43. The upper and lower filter members 11, 12 are formed by cutting filter paper or a non-woven fabric into a predetermined shape so that these filter members 11, 12 have substantially the same shape. A peripheral portion 15 is formed at a periphery of each of the filter members 11, 12, and an opening 11b for receiving an end portion of the coupling member 43 is formed through a central portion of the filter member 11.

The porous member 14 may be a foamed member, a sponge-like member, or the like, which is made of a material, such as polyester, nylon, or polypropylene, as widely known in the art. Namely, the porous member 14 may be formed from any type of member provided that it forms oil paths through which the fuel is allowed to flow without any difficulty, and that it is able to retain its original shape. In fabricating the fuel filter 40, the porous member 14 is first formed in the shape of a flat plate whose thickness is substantially equal to that of the filter 40, and is then cut into a suitable shape in accordance with the shape of the upper and lower filter members 11, 12.

Subsequently, the porous member 14 is interposed between the upper filter member 11 and the lower filter member 12. The peripheral portions 15 of the upper filter member 11 and the lower filter member 12 are welded onto a peripheral portion of the porous member 14 by thermal welding means, such as ultrasonic welding or electrodeposition, while force is being applied from the upper and lower sides of the filter members 11, 12 to the peripheral portions 15. In this manner, the porous member 14 fills the inner space between the filter members 11, 12, to thus form fuel paths in the filter 40.

In the fourth embodiment as described above, the peripheral portion of the porous member 14 is formed simultaneously with the peripheral portions of the upper filter member 11 and the lower filter member 12 through the thermal welding means. However, the porous member 14 may be initially formed into a shape corresponding to that of the inner space of the filter 40, and the peripheral portions 15 of the upper and lower filter members 11, 12 may be welded together by thermal welding means, such as ultrasonic welding or electrodeposition.

The coupling member 43 consists of a pipe-like member 43f having a flange 43b formed around a lower portion of the member 43f. The coupling member 43 and the upper filter member 11 are integrated with each other by aligning a hollow portion of the pipe-like member 43f with the opening 11b of the upper filter member 11, and fixing or securing the lower end face of the flange 43b to the upper surface of the upper filter member 11 with an adhesive, or the like.

Since the fuel filter 40 is not provided with the lower member 13c of the coupling member 13 provided at the bottom of the filter 10, 20, 30 as shown in FIG. 1 through FIG. 3, the fuel filter 40 surely abuts on the bottom of the fuel tank, so that the fuel in the fuel tank can be pumped up without fail.

While the fourth embodiment of the invention is a modified example of the first embodiment as described above, the second and third embodiments of the invention may also be modified in the same manner, by employing the coupling member 43 having only the upper flange 43b. Furthermore, while the filter 40 has a generally rectangular shape in the fourth embodiment, the filter may have a circular shape, or any other shape.

Fifth Embodiment

Figure 5:
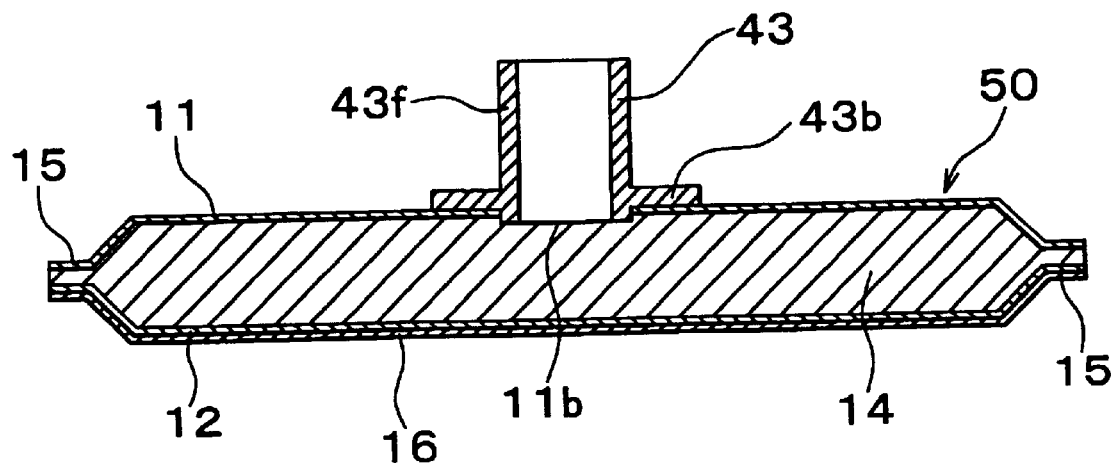
FIG. 5 is a cross-sectional view showing a fuel filter according to a fifth embodiment of the invention.

FIG. 5 illustrates an in-tank type fuel filter 50 according to a fifth embodiment of the invention. In this embodiment, the coupling member 43 is provided on the upper filter member 11 like the fourth embodiment, and a mesh screen is further provided on the lower surface of the lower filter member 12 so as to reinforce the bottom portion of the filter 50.

The fuel filter 50 has a generally rectangular shape as viewed in a plane perpendicular to the sheet of FIG. 5. The fuel filter 50 is coupled, via the coupling member 43, to the upstream side of a fuel pump installed in a fuel tank of a motor vehicle.

The fuel filter 50 includes an upper filter member 11, a lower filter member 12, a porous member 14 disposed between the filter members 11, 12, and the coupling member 43. The upper and lower filter members 11, 12 are formed by cutting filter paper or a non-woven fabric into a predetermined shape so that these filter members 11, 12 have substantially the same shape. A peripheral portion 15 is formed at a periphery of each of the filter members 11, 12, and an opening 11b for receiving an end portion of the coupling member 43 is formed through a central portion of the filter member 11.

The porous member 14 may be a foamed member, a sponge-like member, or the like, which is made of a material, such as polyester, nylon, or polypropylene, as widely known in the art. Namely, the porous member 14 may be formed from any type of member provided that it forms oil paths through which the fuel is allowed to flow without any difficulty, and that it is able to retain its original shape. In fabricating the fuel filter 50, the porous member 14 is first formed in the shape of a flat plate whose thickness is substantially equal to that of the filter 50, and is then cut into a suitable shape in accordance with the shape of the upper and lower filter members 11, 12.

Subsequently, the porous member 14 is interposed between the upper filter member 11 and the lower filter member 12. The peripheral portions 15 of the upper filter member 11 and the lower filter member 12 are welded onto a peripheral portion of the porous member 14 by thermal welding means, such as ultrasonic welding or electrodeposition, while force is being applied from the upper and lower sides of the filter members 11, 12 to the peripheral portions 15. In this manner, the porous member 14 fills the inner space between the filter members 11, 12, to thus form fuel paths in the filter 50.

In the fifth embodiment as described above, the peripheral portion of the porous member 14 is formed simultaneously with the peripheral portions of the upper filter member 11 and the lower filter member 12 through the thermal welding means. However, the porous member 14 may be initially formed into a shape corresponding to that of the inner space of the filter 50, and the peripheral portions 15 of the upper and lower filter members 11, 12 may be welded together by thermal welding means, such as ultrasonic welding or electrodeposition.

The coupling member 43 consists of a pipe-like member 43f having a flange 43b formed around a lower portion of the member 43f. The coupling member 43 and the upper filter member 11 are integrated with each other by aligning a hollow portion of the pipe-like member 43f with the opening 11b of the upper filter member 11, and fixing the lower end face of the flange 43b to the upper surface of the upper filter member 11 by an adhesive, or the like. Then, a mesh screen 16 is fixed or secured to the entire area of the lower surface of the lower filter member 12 by fixing means, such as an adhesive. The mesh screen 16, which is made of a synthetic resin, may be a roughly woven sheet having a multiplicity of holes, or may be a thin, flat sheet having a multiplicity of holes.

In the above-described fourth embodiment, the lower filter member 12, if it is made from filter paper, may wear due to friction or abrasion between the lower filter member and the bottom wall of the fuel tank. In the fifth embodiment constructed as described above, on the other hand, the lower filter member 12 is less likely to wear due to abrasion, and the durability of the fuel filter 50 is improved.

While the fifth embodiment of the invention is a modified example of the first embodiment as described above, the second and third embodiments of the invention may also be modified in the same manner, by employing the coupling member 43 having only the upper flange 43b and the mesh screen 16 provided on the lower filter member 12. Furthermore, while the filter 50 has a generally rectangular shape in the fifth embodiment, the filter may have a circular shape, or any other shape.

Sixth Embodiment

Figure 6:
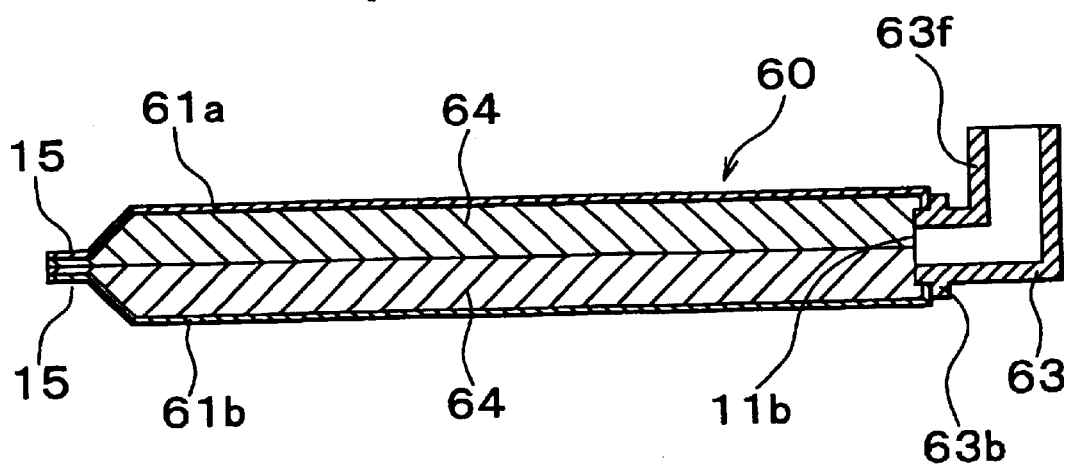
FIG. 6 is a cross-sectional view showing a fuel filter according to a sixth embodiment of the invention.
Figure 7:
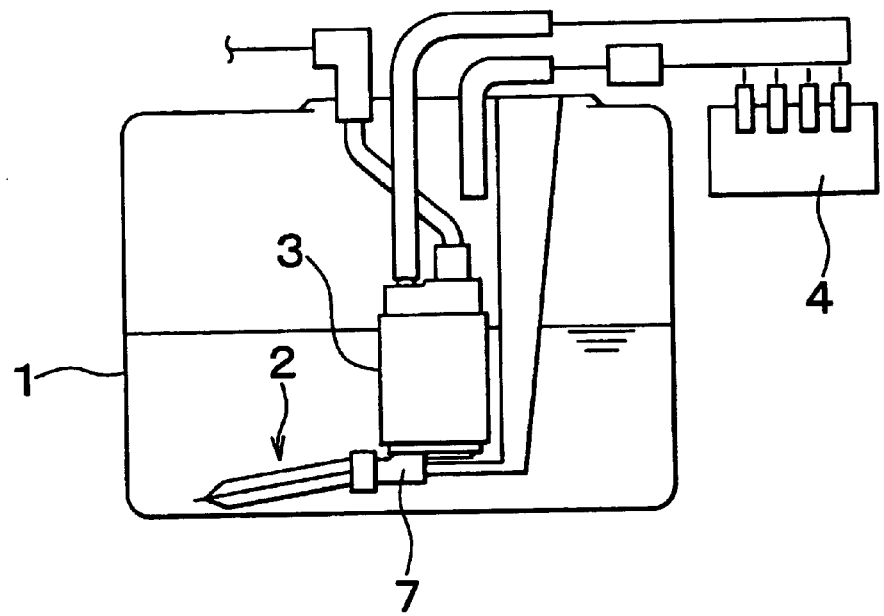
FIG. 7 is a cross-sectional view showing a state in which a known in-tank type fuel filter is mounted in position.
Figure 8:
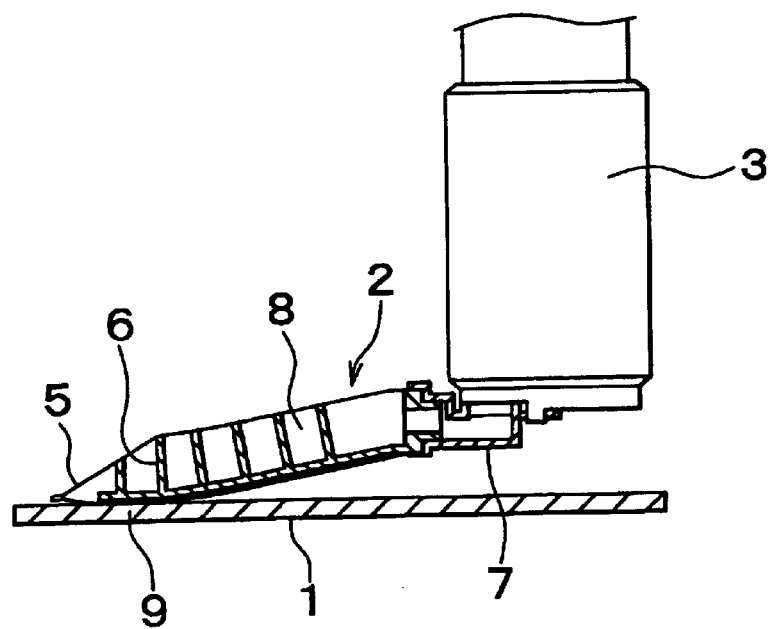
FIG. 8 is a cross-sectional view showing the in-tank type fuel filter of FIG. 7 in detail.

FIG. 6 illustrates an in-tank type fuel filter 60 according to a sixth embodiment of the invention. The fuel filter 60 has a four-layer structure like the fuel filter 30 of the third embodiment, but is different from the filter 30 in that a coupling member is attached to one side face of the filter 60.

The in-tank type fuel filter 60 has a generally rectangular shape as viewed in a plane perpendicular to the sheet of FIG. 6. The fuel filter 60 is coupled, via a coupling member 63, to the upstream side of a fuel pump installed in a fuel tank of a motor vehicle.

The fuel filter 60 includes an upper filter member 61a, a lower filter member 61b, a two-layer porous member 64 disposed between the upper filter member 61a and the lower filter member 61b, and the coupling member 63. The upper and lower filter members 61 are formed by cutting filter paper or a non-woven fabric into a predetermined shape having a length that is twice the length of the fuel filter 60. A peripheral portion 15 is formed at a periphery of the filter members 61a, 61b.

The two-layer porous member 64 may be a foamed member, a sponge-like member, or the like, which is made of a material, such as polyester, nylon, or polypropylene, as widely known in the art. Namely, the porous member 64 may be formed from any type of member provided that it forms oil paths through which the fuel is allowed to flow without any difficulty, and is also able to retain its original shape. In fabricating the fuel filter 60, the porous member 64 is first formed in the shape of a flat plate whose thickness is a half of the thickness of the filter 60, and whose length is twice the length of the filter 60.

Subsequently, one surface of the porous member 64 is bonded to one surface of a filter member by an adhesive, or the like, to form a two-layer structure, which is then folded at a longitudinally middle portion thereof with one half of the porous member 64 facing the other half, thereby to form a four-layer structure. Thus, the upper filter member 61a and the lower filter member 61b are formed. Then, the peripheral portions 15 of the upper filter member 61a and lower filter member 61b except the folded portion thereof are welded onto a peripheral portion of the porous member 64 by thermal welding means, such as ultrasonic welding or electrodeposition, while force is being applied from the upper and lower sides of the filter members 61a, 61b. In this manner, the porous member 64 fills the inner space between the upper filter member 61a and lower filter member 61b, to thus form fuel paths in the filter 60. In addition, an opening 11b is formed in a substantially middle portion of the folded portion of the two-layer structure consisting of the filter member and the porous member 64, such that an end portion of the coupling member 63 is inserted into the opening 11b.

In the sixth embodiment as described above, the peripheral portion of the porous member 64 except the folded portion thereof is formed simultaneously with the peripheral portions of the upper filter member 61a and the lower filter member 61b through the thermal welding means. However, the porous member 64 may be initially formed into a shape corresponding to the shape of the inner space of the filter 60, and the peripheral portions 15 of the upper filter member 61a and lower filter member 61b may be welded together by thermal welding means, such as ultrasonic welding or electrodeposition, after the two-layer structure of the filter member and the porous member 64 is folded at a central portion thereof.

The coupling member 63 consists of a pipe-like member 63f having a flange 63b formed around a lower portion of the member 63f. The coupling member 63 and the two-layer structure of the filter member and the porous member 64 are integrated with each other by aligning a hollow portion of the pipe-like member 63f with the opening 11b of the folded portion of the two-layer structure, and fixing the lower end face of the flange 63b to the outer surface of the folded portion by an adhesive, or the like. With this arrangement, the fuel pump disposed within the fuel tank can be located in the vicinity of the inner wall of the fuel tank.

While the fuel filter 60 has a generally rectangular shape in this embodiment, the filter may have any other shape provided that the folded portion is formed straight.

What is claimed is:

1. A filter, comprising:
   at least one filter member that forms at least two opposed surfaces that face each other;
   at least one porous member contained in the at least one filter member; and
   a coupling member having an opening that is open to the at least one porous member so that the porous member communicates with the coupling member,
   wherein a space between the at least two opposed surfaces of the at least one filter member is filled with the at least one porous member, the at least one filter member removes foreign matters contained in a liquid, and the liquid from which the foreign matters are removed is discharged through the porous member and the coupling member.

2. The filter according to claim 1, wherein the at least one filter member comprises first and second filter members, and wherein the first and second filter members and the porous member form a three-layer structure in which the first and second filter members cover upper and lower surfaces of the porous member, respectively.

3. The filter according to claim 1, wherein the at least one filter member comprises first and second filter members, and the at least one porous member comprises first and second porous members, and wherein the first porous member and the first filter member covering one surface of the first porous member and the second porous member and the second filter member covering one surface of the second porous member form a four-layer structure in which the other surface of the first porous member is superposed on the other surface of the second porous member.

4. The filter according to claim 1, which comprises a four-layer structure that is formed by bending a two-layer structure comprising one porous member and one filter member covering one surface of the porous member, at a substantially middle portion of the two-layer structure.

5. The filter according to claim 1, wherein the at least one filter member comprises filter paper.

6. The filter according to claim 1, wherein the at least one filter member comprises a non-woven fabric.

7. The filter according to claim 1, wherein the at least one filter member comprises a non-woven fabric and a mesh screen.

8. The filter according to claim 1, wherein the at least one filter member comprises upper and lower filter members between which the at least one porous member is interposed, and wherein the coupling member is provided on the upper filter member.

9. The filter according to claim 8, wherein the lower filter member comprises one of filter paper and a non-woven fabric, and a mesh screen.

10. The filter according to claim 1, wherein the at least one filter member comprises upper and lower filter members between which the at least one porous member is interposed, and wherein the coupling member extends from the upper filter member to the lower filter member.

11. The filter according to claim 1, wherein the coupling member is provided on a side face of the at least one filter member.

* * * * *